(12) United States Patent
Anderson

(10) Patent No.: US 6,209,808 B1
(45) Date of Patent: Apr. 3, 2001

(54) SPREADER ATTACHMENT

(75) Inventor: Mark W. Anderson, Aspers, PA (US)

(73) Assignee: GVM, Incorporated, Biglerville, PA (US)

( * ) Notice: Subject to any disclaimer, the term of this patent is extended or adjusted under 35 U.S.C. 154(b) by 0 days.

(21) Appl. No.: 09/479,115

(22) Filed: Jan. 7, 2000

(51) Int. Cl.$^7$ ............................................. A01C 17/00
(52) U.S. Cl. ..................... 239/682; 239/666; 239/673; 239/676; 239/688
(58) Field of Search ................................ 239/661, 665, 239/666, 672, 673, 674, 675, 676, 682, 687, 688

(56) References Cited

U.S. PATENT DOCUMENTS

| | | |
|---|---|---|
| Re. 19,801 | 12/1935 | Mosgrove . |
| 1,959,108 | 5/1934 | Read . |
| 2,612,294 * | 9/1952 | Dorschner ........................ 239/675 X |
| 2,766,872 | 10/1956 | Pillsbury . |
| 2,989,314 | 6/1961 | Larson . |
| 3,109,657 | 11/1963 | Dreyer . |
| 3,232,627 * | 2/1966 | Larson ................... 239/666 |
| 3,322,429 * | 5/1967 | Cervelli ............................ 239/675 X |
| 3,406,915 | 10/1968 | Dreyer . |
| 3,539,113 * | 11/1970 | Tyler ................................. 239/676 X |
| 3,931,934 * | 1/1976 | Smith ................................. 239/676 X |
| 4,725,005 | 2/1988 | Wiegelmann . |
| 4,763,844 * | 8/1988 | Van Der Lely et al. ............. 239/665 |
| 4,834,296 | 5/1989 | van der Lely et al. . |
| 4,842,202 | 6/1989 | van der Lely et al. . |

* cited by examiner

Primary Examiner—David A. Scherbel
Assistant Examiner—Steven J. Ganey
(74) Attorney, Agent, or Firm—McNees, Wallace & Nurick; Mitchell A. Smolow; Carmen Santa Maria

(57) ABSTRACT

A dual disc spreader attachment utilizing a specific direction of disc rotation, pinpoint control of the impact point of material onto the disc and blade design to provide an optimal scatter pattern.

20 Claims, 3 Drawing Sheets

SPREADER ATTACHMENT

BACKGROUND OF THE INVENTION

1. Field of the Invention

This invention generally relates to a spreader attachment utilized to evenly distribute material, and specifically to a spreader attached to a farm vehicle to distribute granular and/or powdery material.

2. Discussion of the Related Art

Farmers, landscapers, and others needing to spread material over large areas need a spreading device that will allow for rapid distribution of the material being spread, covering a large area in an even spread pattern, completed in a reasonably short period of time. The spreading device often determines the success of the operation. While there have been many spreaders brought to the marketplace, the prior art spreaders do not produce a uniform distribution in a cost efficient manner. Those spreaders that do effect a uniform distribution fail to spread over a sufficiently large enough area to keep the operation within reasonable costs.

Dual disc centrifugal spreaders are well known in the art. They generally are comprised of flat discs that cast off particulate material in a horizontal plane. To achieve maximum results, these discs must maintain constant circumferential speed. The power to turn the discs generally comes from either rotating wheels contacting the ground translated through various gearing mechanisms, or power comes via a power take-off drive. While power take-off drives generally produce more constant circumferential speed, both powering methods produce irregularities in the scatter pattern over the entire scatter width, leading to overspreading of material and/or bald spots from underspreading of material, both of which cause irregular plant growth.

While higher circumferential disc speeds provide more uniform scatter patterns, they oftentimes provide too strong of an overlapping pattern in the center (behind the vehicle), laying down excess material. When the circumferential disc speed is reduced, the periphery of the scatter pattern becomes very steep outwardly, resulting in reduced spreading in the center (behind the vehicle).

Typical in the prior art, centrifugal spreaders have scoop members provided on the rotating discs for catching the ejected material and hurling this material centrifugally outward onto the ground. Both straight edge scoop members and curved scoop members having their concave side directed toward the rotating direction of the disc have been utilized to attain as broad a dispersion zone as possible by increasing the hurling distance of the material centrifugally outward of the discs.

To achieve a uniform spreading pattern, it is important for centrifugal spreaders to have the material to be spread fall upon the rotating disc within a definite area. U.S. Pat. No. 3,406,915 to Dreyer, et al. achieves this through the use of a releasable or pivotable shoot or tube underneath the opening in the hopper.

U.S. Pat. No. 3,109,657 to Dreyer is directed to a centrifugal spreader for particle fertilizer material. Material ejects out the side of a storage bin onto rotating discs having one curved scoop member and one straight scoop member. The curved member is C-shaped in cross section but maintains a constant height along the length of the member. The material feeds directly from the storage bin onto the rotating discs, the left disc, when viewed from behind, rotating clockwise and the right disc rotating counter clockwise.

U.S. Pat. No. 4,842,202 to van der Lely et al. is directed to a spreader with a hopper having two delivery parts. Distribution members are provided under the delivery parts for broadcasting material fed to them from the hopper. The distribution members are mounted on a carrier rigidly supported by and coupled to the hopper. Because the material is stored directly over the discs, a frame having significant rigidity is required.

The material feeds from the hopper directly to outlet orifices at the bottom of the hopper onto two circular discs. The discs rotate counter to one another. Each disc contains blades having a geometry that flares outward at a 15° angle, including a blade visually flaring, and a blade structure directed away from the rotary axis.

What is needed, therefore, is an improved device that will provide a uniform scatter pattern and throw width, while also providing an optimal overlapping of the scatter pattern produced by multiple discs, both toward the outside or periphery of the pattern, and in the area directly behind the vehicle.

SUMMARY

The present invention is directed to an apparatus that satisfies the need to provide a substantially uniform scatter pattern and throw width of material being spread, providing an optimal overlapping of the scatter pattern produced by multiple discs, both towards the outside or periphery of the pattern, and in the area directly behind the vehicle, utilizing a light weight unit and in a cost efficient manner.

In one form, the present invention includes at least one pair of funnel units, each having a first end opposed to a second end. The funnel units are mechanically attached in a substantially vertical plane adjacent to a hopper having a dispensing outlet for dispensing material to each of the funnel units first end.

There are at least one pair of rotating discs consisting of a first disc rotating counter-clockwise, when viewed from behind, positioned left of a second disc rotating clockwise. These first and second discs have a plurality of blades mechanically attached thereon for dispensing the material in a pre-selected pattern. The first and second discs are each rotatably positioned below one of the funnel unit second ends, so as to receive material passing through the funnel units. Each funnel unit directs the material to at least one designated impact point on each of the rotating discs.

In another form, the present invention has at least one pair of funnel units each having a first end opposed to a second end. The funnel units are mechanically attached in a substantially vertical plane remotely from a hopper having a dispensing outlet for dispensing material. A conveyor transports the material from the dispensing outlet to each of the funnel unit first ends.

There are at least one pair of rotating discs consisting of a first disc rotating counter-clockwise when viewed from behind, positioned left of a second disc rotating clockwise. The first and second discs have a plurality of blades mechanically attached thereon for dispensing said material in a pre-selected pattern. The first and second discs each are rotatably positioned below one of the funnel unit second ends to receive material passing through the funnel units. Each funnel unit directs the material to at least one designated impact point on each of the rotating discs.

In yet another form, the present invention receives material from a hopper which is located above a structural component of a vehicle.

An advantage of the present invention is that the specific direction of rotation of the discs (that is, the left disc, when viewed from behind, rotating counter-clockwise and the right disc rotating clockwise), provides for an increase in the width of the spread pattern with even coverage throughout the spread pattern, allowing for delivery of more product in fewer passes equaling a lower cost per acreage to deliver the material.

Another advantage of the present invention is that the funnels, utilizing deflecting vanes, allow for complete control over the point of impact of the material onto the rotating discs, allowing for increased control of the spread pattern and evenness of material spread throughout the pattern.

Still another advantage of the present invention is that the blade design allows for increased width of the spread pattern, while still maintaining even spread throughout the pattern.

Still another advantage of the present invention is the ability to locate the hopper which holds the material above a structural component of the vehicle. Because the hopper and material (comprising the bulk of the weight) is supported by the structural component of the vehicle, the spreader attachment of the present invention may be located remotely from the hopper, yet it does not require a frame having significant rigidity and weight.

The combination of the specific direction of rotation of the discs, the pinpoint control of the impact point of the material onto the discs, and the blade design act synergistically to smooth the scatter pattern and the throw width, providing an optimal overlapping of the scatter pattern produced by the multiple discs, both toward the outside or periphery of the pattern, and in the middle (behind the vehicle), which until now, has been unachievable in the art.

Other features and advantages of the present invention will be apparent from the following more detailed description of the preferred embodiment, taken in conjunction with the accompanying figures which illustrate, by way of example, the principles of the invention.

All references cited in the preceding sections are incorporated by reference as if fully set forth herein.

DETAIL DESCRIPTION OF THE INVENTION

Whenever possible, the same reference numbers will be used throughout the figures to refer to the same parts.

Figure 1:
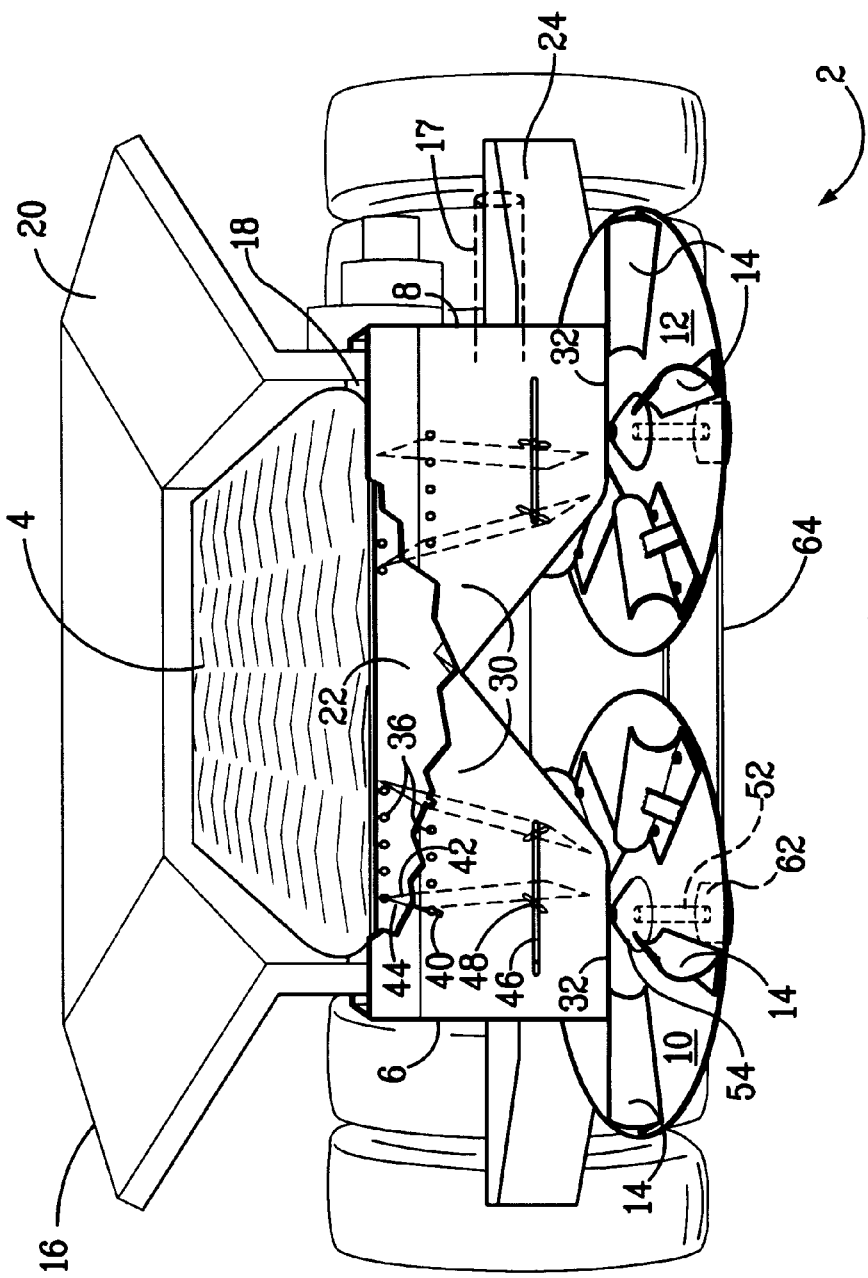
FIG. 1 is a spreader attachment of the present invention, showing the spreader attached to a farm vehicle with a hopper positioned over the vehicle frame.

Referring now to FIG. 1 which shows the spreader attachment 2 of the present invention, the apparatus is comprised of a conveyor 4, first 6 and second 8 funnel units, and a first 10 and second 12 rotating disc, each having a plurality of blades 14 attached thereon. The apparatus of the present invention is mechanically attached, for example, by bolting or welding to the storage vehicle 16, such that the spreader attachment 2 of the present invention is cantilevered off the storage vehicle 16, and positioned below an exit orifice 18 of a hopper 20, the hopper 20 being attached to the storage vehicle frame.

Positioned below the hopper exit orifice 18 so as to receive material exiting from the orifice 18 is a conveyor 4. The conveyor 4 is a rubber belt, but may be any transport method, for example, a screw type worm. The conveyor 4 terminates at a point above a drop box 22 comprising a first 6 and second 8 funnel unit, so as to deposit material being transported by the conveyor 4 into these funnel units at each funnel unit first end 30. The first and second units are positioned in such a manner so as to receive substantially equal amounts of material being conveyed. This may be accomplished, for example, by placing the first 6 and second 8 funnel units side by side at the terminal end of the conveyor 4.

The conveyor 4 may be powered independently, for example, by utilizing a variable speed electric motor or by hydraulic power, or the conveyor 4 may be powered through mechanical linkage to the axles 17 of the storage vehicle 16. When mechanically linked to the axles 17 of the storage vehicle 16, the conveyor 4 will speed up or slow down as the vehicle speed increases or decreases respectively. Likewise, if powered independently, the conveyor 4 may be speeded up or slowed down by direct operator control or through the use of a microprocessor which senses the ground speed. The amount of material reaching the funnel units is directly related to the resulting coverage rate.

Figure 2:
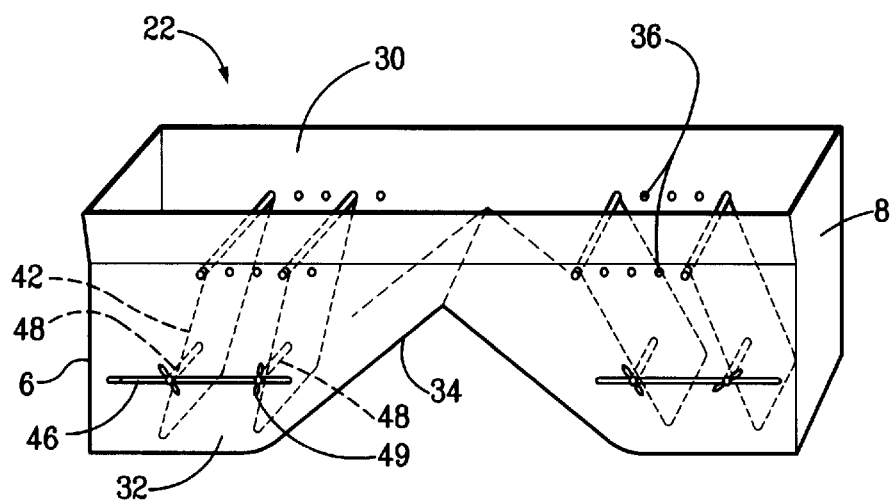
FIG. 2 is a view of a drop box comprising the first and second funnel units.
Figure 3:
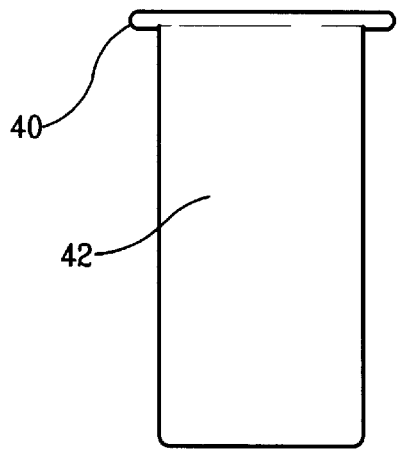
FIG. 3 is a view of a deflecting vane.

The first 6 and second 8 funnel units are mirror images of one another. For the sake of brevity, only one will be described in detail, however, it should be appreciated that this detailed description applies to both funnel units. As shown in FIG. 2, the funnel 6 is comprised of rigid or semi-rigid material such as, for example, stainless steel, aluminum or other metal, or it may be manufactured of plastic such as polycarbonate, polystyrene, nylon or other corrosive resistant material. The funnel unit 6 is wider at the funnel unit first end 30 than at the funnel unit second end 32, with a rectangular cross section, with at least one sloping side 34 connecting the funnel unit first end 30 with the funnel unit second end 32. There are a plurality of matched receiving holes 36 located in the front and rear walls utilized for inserting the ears 40 (FIG. 3) of a deflecting vane 42. The deflecting vane 42 is a rectangular flat sheet, sized to integrally fit within the drop box 22. A first end of the vane 42 has a pair of ears 40 extending laterally in a position so as to fit into a set of matched receiving holes 36, allowing the deflecting vane 42 to hang by its ears and rotate in an arc. Positioned below these adjusting holes is a slot 46 through which passes a bolt 48. The head of the bolt 48 extends into the drop box 22, preventing the deflecting vane 42 from traveling through its arc. Wing nuts 49 are attached to the bolt 48 as it passes through the slot 46, allowing for adjustment of the bolt 48 position (and therefore the position of the deflecting vane 42) without the need for tools. The wing nut bolt combination allows for accurate positioning of the deflecting vane 42 so as to direct the passing material to strike a specific point on a rotating disc 10 (FIG. 1). Alternatively, a slotted tab (not shown) extending perpendicularly from the non-deflecting side of the deflecting vane 42 could receive the bolt 48 as it passed through an arced slot 46 to provide for more rigid locking of the deflecting vane 42.

Referring again to FIG. 1, positioned behind the funnel unit 6 and extending outward towards the periphery is a shield or splash plate 24 used to prevent material from being thrown forward underneath the storage vehicle 16. This plate may be manufactured of any rigid or semi-rigid material such as, for example, stainless steel, aluminum, or other metal, or plastic, for example, such as polycarbonate, polystyrene, nylon or other corrosive resistant material.

Positioned below the funnel unit 6 so as to receive material exiting from the funnel unit 6 is a disc 10 rotatably attached by a spindle 52 to a spindle support housing 62. The disc 10 diameter ranges from about 18 inches to about 50 inches, preferably 36 inches, and most preferably, 24 inches. The disc 10 is mechanically attached to the spindle 52 such as by, for example, utilizing a nut and rubber washer combination so that the disc is secured to the spindle 52 so as not to turn freely around it, a non-round receiving hole, matched to fit the spindle end, or the disc may be welded to the spindle 52.

The minimum distance from the splash plate 24 to the spindle 52 is about 16 inches with a maximum distance of about 36 inches, preferably about 18 inches for a twenty-four inch diameter disc. The minimum distance would increase with increasing disc diameter.

Positioned directly above the attachment point of the disc 10 to the spindle 52 is a mushroom shaped cap 54 utilized to deflect material falling from the funnel unit 6 outward towards the periphery of the disc. The cap 54 can be made of any wear material, but nylon is preferred because it is inexpensive and easy to form. The spindle 52 is rotatably received in the spindle support housing 62, the housing 62 being attached to a cross-member 64, and is hydraulically powered to achieve a constant rpm of about 750 rpm to about 1200 rpm, preferably about 950 rpm to about 1050 rpm. Alternatively, the spindle 52 may receive power through the use of an electric motor or it may be mechanically linked to the storage vehicle axle and geared to provide power to rotate the disc at a constant rpm.

Figure 4:
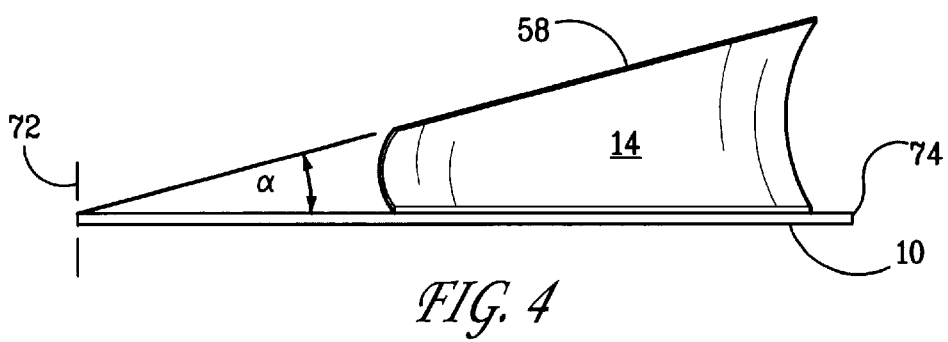
FIG. 4 is a representation of the angle formed by the top edge of the blade and the plane of the disc.
Figure 5:
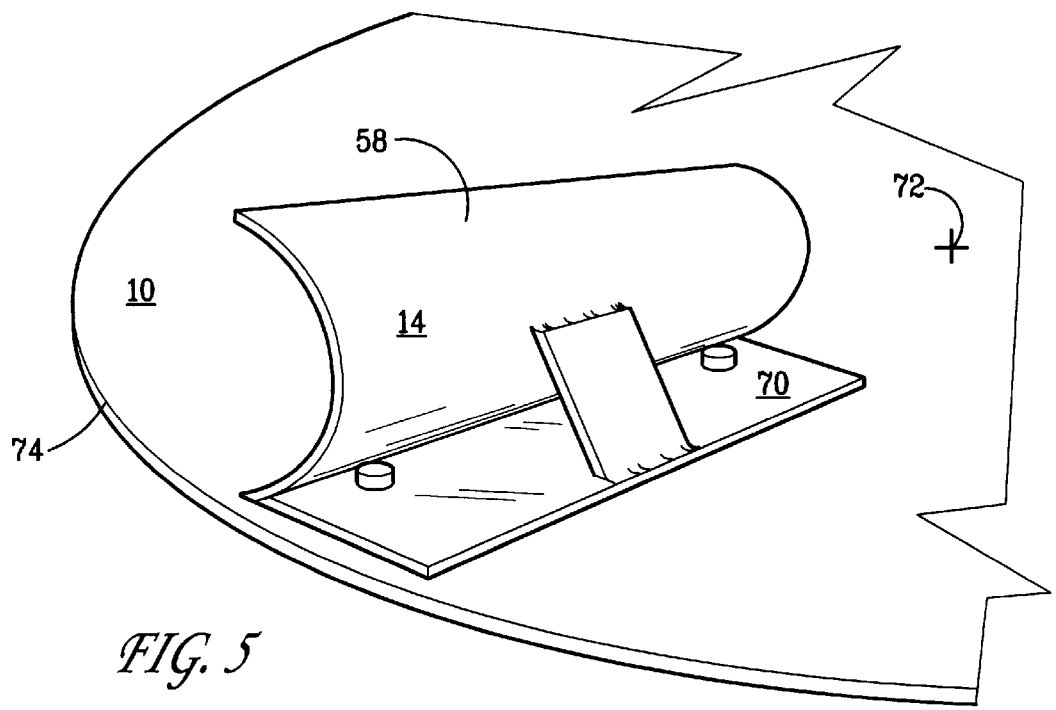
FIG. 5 is a rear view of a blade.
Figure 6:
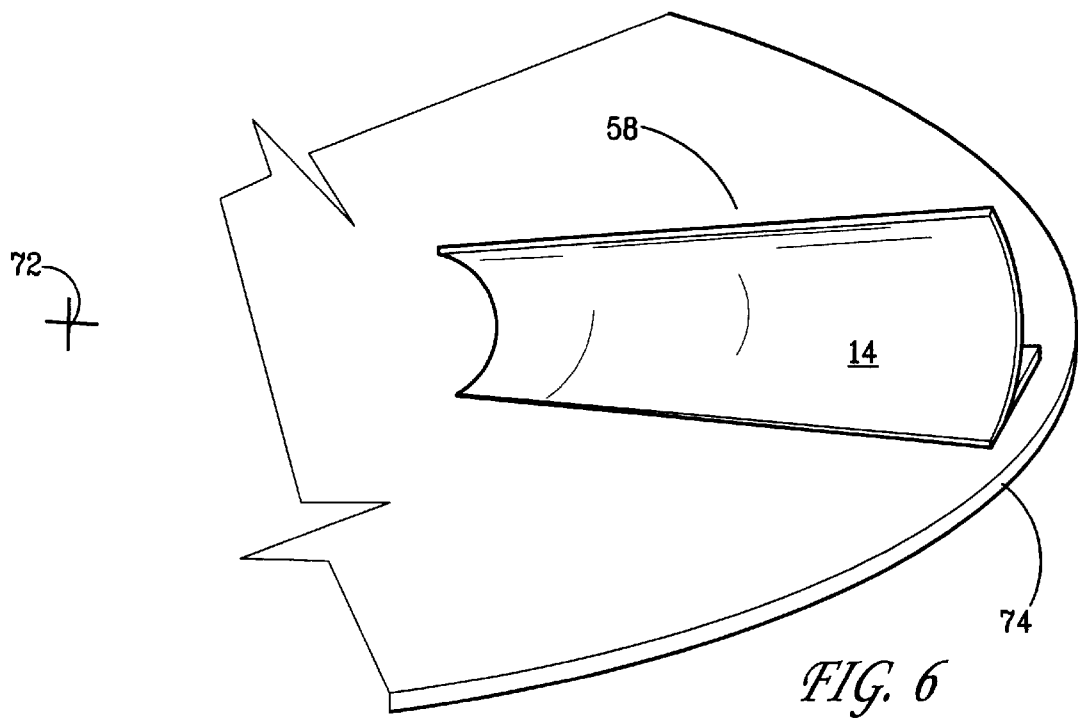
FIG. 6 is a front view of a blade.

Attached to each disc 10, 12 is a plurality of blades 14, preferably five, positioned to catch the material being directed by the funnel unit 6 unto the disc 10 surface and throw the material outward as a result of centrifugal force of the rotating disc 10. As shown in FIG. 4 and FIG. 5, the blade 14 is welded to a plate 70 which is mechanically attached to the disc 10, for example, by bolting or screwing. The blade 14 has an aerodynamic shape that maximizes the dispersion pattern. The blade increases in height as it moves from the central portion of the disc 72 towards the periphery 74, creating an angle a (FIG. 4) formed by the top edge of the blade 58 and the plane of the disc 10 of about 10° to about 45°, preferably about 15°. In cross-section, the profile of the blade 14 may be straight or it may be "C" shaped or "V" shaped.

When viewed from the rear of the vehicle, the first disc 10 located on the left side rotates counter-clockwise, while the second disc 12 located on the right side rotates clockwise. The two discs rotate at substantially the same RPM. Preferably, the discs lie in a substantially flat plane, although they may be angled such that their intersecting planes form either an acute or an obtuse angle.

The discs are substantially flat, with the blades 14 being chamfered to provide for a smooth transition from disc 10 to blade 14. This smooth transition from disc 10 surface to blade 14 does not impede the flow of material from the disc 10 surface to the blade 14. Returning to FIG. 1, the disc centers 72 are equi-distant, central to the conveyor 4 and rearward of the material drop off points. The discs are located at a distance of about 10 inches to about 24 inches below the conveyor 4, preferably about 18 inches.

In a different embodiment, a wear plate with holes cut for the blades is fit over the disc 10, allowing for a smooth transition from wear plate to blade. The base plate is removably attached to the disc, for example, by bolting or screwing. In this manner, the more expensive disc would not have to be replaced due to wearing, as all material would contact only the wear plate, relatively less costly to replace.

Referring to FIGS. 1 through 5, in use, the present invention operates as follows: material to be spread exits the storage hopper 20 onto the conveyor 4, or alternatively, directly into the funnel unit first ends 30. The flow of material from the hopper 20 onto the conveyor 4 is controlled by the operator using methods well known in the art, for example, by increasing or decreasing the conveyor speed. The amount of material exiting the conveyor 4 has a direct influence on the resulting coverage rate, thus allowing the operator to pre-select a desired coverage rate. The conveyor 4 transports the material to the first end of the funnel unit and deposits the material into the funnel unit first end 30. As the material passes through the funnel unit 6, the user positioned deflecting vanes 42 direct material onto a specific location of the rotating disc 10. The point of impact is important as this will affect the pattern of the distribution material. The longer the material remains in contact with the rotating disc 10, the greater the material will be thrown behind the vehicle. Material should contact the rotating discs without first coming into contact with the blades 14. The blades 14 of the rotating disc 10 gather the material deposited onto the disc 10 and through centrifugal force throws the material outward and rearward.

The deflecting vanes 42 are positioned by loosening the wing nut 49, attached to the bolt 48, and sliding the bolt 48 to a position in slot 46, so that the deflecting vane 42 rests against the bolt 48 in the desired position. The wing nut 49 is tightened to hold the bolt 48 in place.

Because the material to be spread is transported from a hopper 20 integral or attached to the storage vehicle 16 and is not being stored in or directly over the spreader attachment 2 itself, the spreader structural support previously referenced to withstand the weight load can be eliminated. The hopper 20 may be located above a structural component of the storage vehicle 16, for example, the axle 17. Because the weight of the material to be dispersed is being borne by the storage vehicle 16 (supporting the hopper) and not the spreader attachment 2, the present invention does not need the structural support and rigidity required by the prior art. In this manner, both the overall weight and cost to manufacture the present invention is reduced.

It has been found that the synergistic effect of the specific direction of rotation of the two discs as described above allows for a wider spread pattern with more even distribution. In field trials, most materials to be spread can achieve a 15% co-efficient of variation with a bout width of 30–35 meters. The open disc design allows for the discs to operate in the previously described direction for all material types to be spread, with no loss of performance with varying material characteristics. Performance is not negatively effected if the spreader attachment of the present invention is fitted to a wide vehicle, as little product is thrown forward of the vehicle and that which is, is thrown at only a slight upward angle.

The width of the spread pattern can be increased to as great as about 40 to 50 meters or decreased to as little as slightly larger than the outside perimeter of the discs, while still maintaining an even distribution throughout the pattern.

Although the present invention has been described in connection with specific examples and embodiments, those skilled in the art will recognize that the present invention is capable of other variations and modifications within its scope. For example, the spreader attachment of the present invention may be integral with a farm vehicle.

These examples and embodiments are intended as typical of, rather than limiting the scope of the present invention as presented in the appended claims.

What is claimed is:

1. An apparatus for spreading a material comprising:
   at least one pair of funnel units, each unit having a first end and an opposed end; and
   at least one pair of rotating discs comprised of a first disc rotating counter-clockwise positioned adjacent to a second disc rotating clockwise, the first and second discs having a plurality of substantially radially oriented blades attached thereon for dispersing the material in a pre-selected pattern;
   the first and second discs each rotatably positioned below the second end of one of the at least one pair of funnel units to receive the material passing through the funnel units,
   wherein the material as it passes through the at least one pair of funnel units is directed to a predetermined impact point on each of the rotating discs by at least one deflecting vane integrally fit and movably attached within the funnel units.

2. The plurality of blades of claim 1 wherein the angle formed by the top edge of each blade and a plane containing the disc in which the disc rotates is about 10° to about 45°, wherein there is a smooth transition from a disc surface to the plurality of blades so as not to impede the flow of material.

3. The plurality of blades of claim 2 wherein the angle formed by the top edge of each blade and a plane containing the disc in which the disc rotates is about 15°, wherein there is a smooth transition from a disc surface to the plurality of blades so as not to impede the flow of material.

4. The at least one pair of rotating discs of claim 1 wherein each disc is about 24 inches in diameter and positioned about 18 inches from a splash plate positioned behind the at least one pair of funnel units and extending outwards.

5. The apparatus of claim 1 wherein each disc of the at least one pair of rotating discs includes 5 blades.

6. An apparatus for spreading a material comprising:
   a hopper having a dispensing outlet for dispensing a material;
   at least one pair of funnel units, each unit having a first end and an opposed second end, the at least one pair of funnel units attached in a substantially vertical plane adjacent to the hopper such that each funnel unit first end receives the material from the hopper dispensing outlet and each funnel unit second end discharges the received material; and
   at least one pair of rotating discs comprised of a first disc rotating counter-clockwise positioned left of a second disc rotating clockwise, when viewed from behind a forward direction of travel of the apparatus, the first and second discs having a plurality of blades attached thereon for dispersing the material from the funnel second end in a pre-selected pattern;
   the first and second discs each rotatably positioned below a corresponding one of the at least one pair of funnel units second ends to receive material passing through the second end of the funnel units;
   wherein the material as it passes through the second end of the corresponding funnel unit is directed to at least one pre-selected impact point on the rotating disc by at least one deflecting vane integrally fit and movably attached within the corresponding funnel unit.

7. The at least one pair of discs of claim 6 wherein each disc is about 24 inches in diameter and positioned rearward about 18 inches from a splash plate positioned behind the at least one pair of funnel units and extending outwards.

8. The spreader attachment of claim 6 wherein each disc comprises 5 blades.

9. The spreader attachment of claim 6 wherein the hopper is located above a structural component of a vehicle.

10. The spreader attachment of claim 9 wherein the structural component is an axle.

11. The plurality of blades of claim 6 wherein the angle formed by the top edge of each blade and a plane containing the disc in which the disc rotates is about 10° to about 45°, wherein there is a smooth transition from a disc surface to the plurality of blades so as not to impede the flow of material.

12. The plurality of blades of claim 6 wherein the angle formed by the top edge of each blade and a plane containing the disc in which the disc rotates is about 15°, wherein there is a smooth transition from a disc surface to the plurality of blades so as not to impede the flow of material.

13. An apparatus for spreading a material comprising:
   a hopper having a dispensing outlet for dispensing the material, the hopper located remotely from;
   at least one pair of funnel units, each unit having a first end and an opposed second end, each of the funnel units oriented in a substantially vertical plane with the opposed end below the first end;
   a conveyor to transport the material from the dispensing outlet of the hopper to each of the funnel unit first ends; and
   at least one pair of rotating discs comprised of a first disc rotating counter-clockwise positioned left of a second disc rotating clockwise, when viewed from behind a forward direction of travel of the apparatus, the first and second discs having a plurality of blades attached thereon for dispersing the material in a pre-selected pattern;
   the first and second discs each rotatably positioned below a corresponding one of the at least one pair of funnel units second ends to receive the material passing through the funnel units;
   wherein the material as it passes through the second end of the corresponding funnel unit is directed to at least one pre-selected impact point on the rotating disc by at least one deflecting vane integrally fit and movably attached within the corresponding funnel unit.

14. The plurality of blades of claim 13 wherein the angle formed by the top edge of each blade and a plane containing the disc on which the disc rotates is about 10° to about 45°, wherein there is a smooth transition from a disc surface to the plurality of blades so as to not impede the flow of material.

15. The plurality of blades of claim 13 wherein the angle formed by the top edge of each blade and a plane containing the disc on which the disc rotates is about 15°, wherein there is a smooth transition from a disc surface to the plurality of blades so as not to impede the flow of material.

16. The apparatus of claim 13 wherein each disc of the at least one pair of discs includes a center, the centers of the discs being equi-distant from the conveyor and on opposed sides of a centerline of the conveyor.

17. The at least one pair of discs of claim 13 wherein each disc is about 24 inches in diameter and positioned rearward about 18 inches from a splash plate positioned behind the at least one pair of funnel units and extending outwards.

18. The apparatus of claim 13 wherein each disc of the at least one pair of discs includes 5 blades.

19. The apparatus of claim 13 wherein the conveyor is a belt-type conveyor.

20. The apparatus of claim 13 wherein the conveyor is a worm-type conveyor.

* * * * *